Sept. 15, 1931.  A. V. MELLANO  1,823,569
PNEUMATIC SEAT, CUSHION, AND THE LIKE
Filed Sept. 17, 1928   3 Sheets-Sheet 1
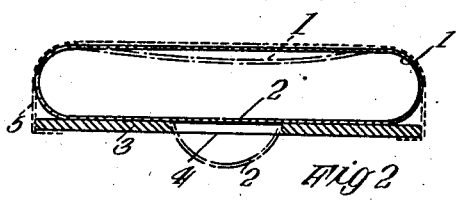
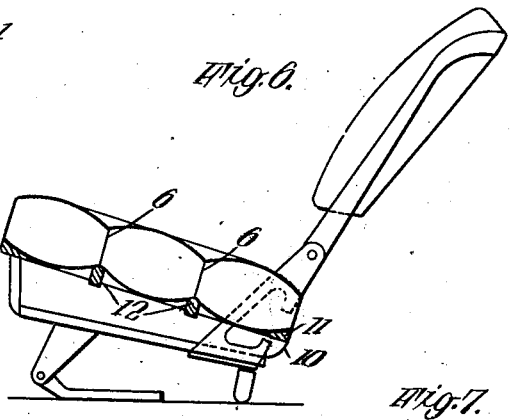
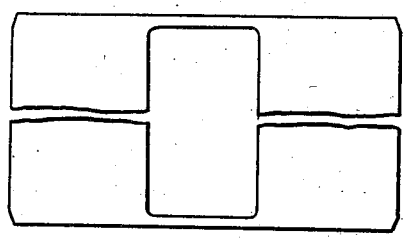
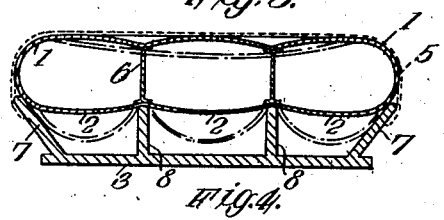
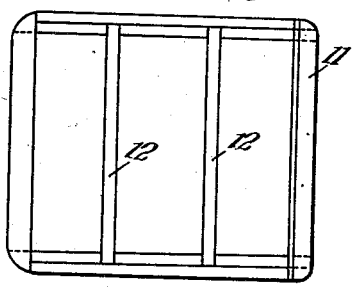
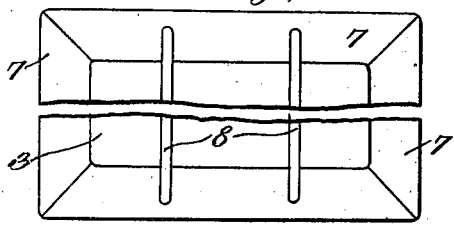
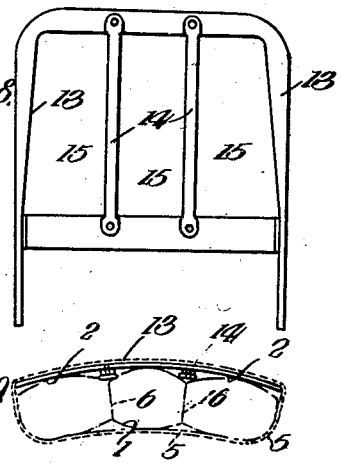
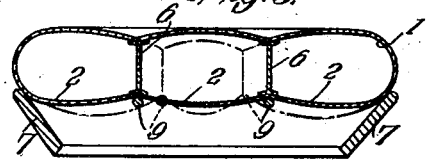
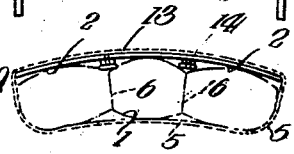
INVENTOR
Aimable Victor Mellano,
By O'Neill & Bunn
ATTORNEYS

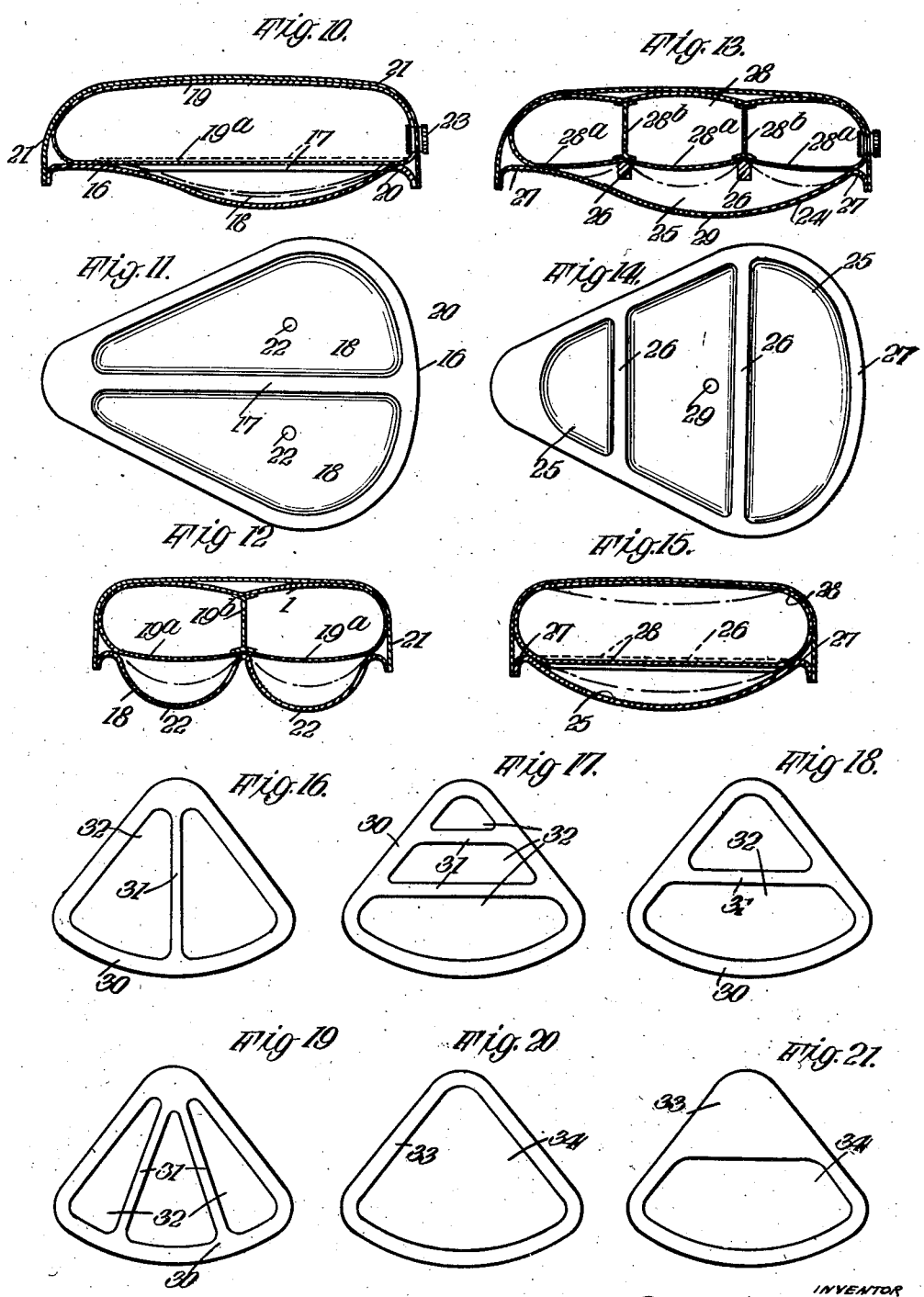

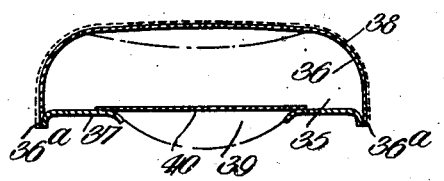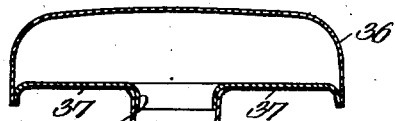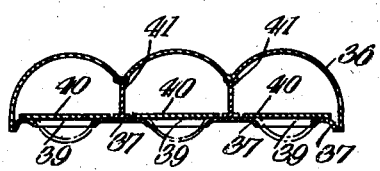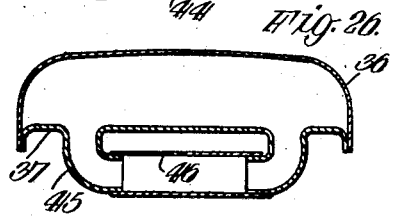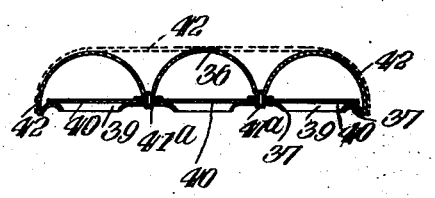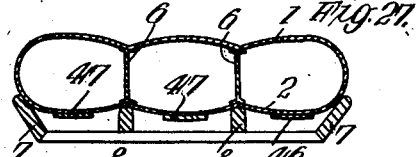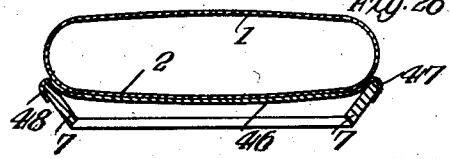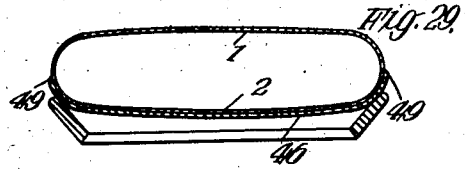

Patented Sept. 15, 1931

1,823,569

UNITED STATES PATENT OFFICE

AIMABLE VICTOR MELLANO, OF THAMES DITTON, ENGLAND

PNEUMATIC SEAT, CUSHION AND THE LIKE

Application filed September 17, 1928, Serial No. 306,307, and in Great Britain September 30, 1927.

This invention relates to pneumatic seats, cushions or the like, and has more particular but not exclusive reference to pneumatic saddles or pillion seats for motor cycles or the like and to pneumatic upholstery for motor driven vehicles. It is desirable to restrain pneumatic seats, cushions or the like when employed in motor cycle saddles and pillion seats or in motor car upholstery so as to prevent undue deformation or distortion of the same when under load or subjected to pressure in order to prevent "rolling" and as such restrained seats, cushions or the like are usually mounted on or against rigid supports or foundations, the air in the seat or cushion becomes compressed to such an extent when the seat or cushion is under load or pressure, that the resiliency is to a large degree destroyed. The chief object of the present invention is to provide a pneumatic cushion or unit which although it may be restrained as aforesaid will under all conditions maintain or provide a satisfactory degree of resiliency and whilst the invention is mainly applicable to motor cycle saddles and pillion seats or to motor vehicle upholstery it can be applied to upholstery for chairs, settees and the like or to pneumatic cushions or the like in general.

According to this invention a pneumatic seat cushion, or the like comprises a chamber, container or the like which is provided or formed in conjunction with a support of such a character that it permits of part of the chamber or container when the latter is under load or pressure, being expanded or distended in or adjacent to the said support so as to prevent compression or undue compression of the air in the said chamber or compartment. Generally the support is in the form of a base or foundation upon which the pneumatic chamber or container may be placed or supported as for example in connection with saddles or pillion seats for motor cycles or with seats of motor vehicles, but in some cases, as for instance in connection with the backs or squabs of motor car upholstery, the pneumatic chamber or container and the support therefor may be arranged in a vertical or inclined position with the support at the rear of the said chamber or container. The support or foundation may take various forms which may depend to some extent on the shape or type of pneumatic chamber or cushion, and in order to enable the chamber or cushion to expand as aforesaid, an opening or openings or a well or recesses may be provided in the support or foundation to receive the extensible part of the chamber or container which is expanded when the latter is under load or subjected to pressure. In some instances a single opening or recess may be provided in a kind of frame forming the support or foundation, but in other cases a plurality of openings or recesses may be provided in a frame or the like for example by providing a series of rigid or other supporting bars, strips or the like that afford support at or adjacent to parts of the pneumatic chamber or container which are capable of expanding between or adjacent to the said strips or similar supports. The construction is generally such that only that part of the pneumatic chamber or container adjacent to the support is allowed to expand. For this purpose, the main part of the chamber or container may be inextensible, for example by making it of inextensible material or by covering it with a flexible but inextensible or substantially inextensible casing or the like. The support or foundation may be provided with inclined or similar surfaces which permit of the expansible part of the chamber or container being distended or expanded without any likelihood of damage due to friction at the supporting surfaces and the said surfaces may be such that the extensible material of the chamber or container during distension may be caused to travel or move gradually in contact with the inclined surfaces. The supports may be so disposed as to register with parts of the pneumatic chamber or container that are inextensible so that expansion only takes place between the supports. Although in most instances the support or foundation may be rigid, it may comprise elastic or extensible material which may stretch to some extent, say under heavy loads, but nevertheless permits of the expansible parts of the container being distended. The pneumatic chamber or container may be a complete unit which is used in conjunction with a support or foundation, but it may be combined with or may form part of the said support or foundation. For instance a suitable material may be united to a support or foundation of metal or other material to provide the air chamber or space between them and the said support or foundation may have an opening or openings over or around which is provided an extensible material that can be distended or expanded when the chamber is under load or pressure. The expansion of the pneumatic chamber or container may be controlled so as to prevent undue distension when the chamber or container is subjected to excessive loads or pressure and for this purpose controlling bands, strips or the like of elastic or resilient material may extend across or in contact with the expansible parts of the pneumatic chamber or container which strips permit of the expansion of the chamber or container under normal loads, but stretch when the container is subjected to excessive loads so as to prevent the expansible parts of the cushion from being unduly stretched.

In order that the said invention may be clearly understood and readily carried into effect, the same will now be described more fully with reference to the accompanying diagrammatic drawings in which:—

Figure 1 is a sectional view showing a pneumatic container mounted on a support or foundation that permits of expansion of the lower part of the container.

Figure 2 is a plan view of the support or foundation shown in Figure 1.

Figures 3 and 4 are similar views to Figures 1 and 2 illustrating another construction of pneumatic container and a modified construction of support or foundation.

Figure 5 illustrates a modification applied to the form of support shown in Figure 3.

Figure 6 is a side view partly in section showing the invention applied to a motor vehicle seat.

Figure 7 is a plan of the foundation or support for the pneumatic seat shown in Figure 6.

Figure 8 is a front view of the support for the back of the seat or squab shown in Figure 6.

Figure 9 is a plan of the support shown in Figure 8 with the pneumatic container illustrated in dotted lines.

Figures 10, 11 and 12 are respectively a longitudinal sectional view, a plan and a transverse sectional view showing the invention applied to a motor cycle saddle or the like.

Figures 13, 14 and 15 are similar views to Figures 10, 11 and 12 illustrating a modified construction of pneumatic saddle or the like.

Figures 16 to 21 illustrate various forms of foundations or supports for the saddles.

Figures 22 to 26 are sectional views illustrating different constructions in which the pneumatic chamber or container is formed between a metal or other suitable base and a covering which is secured thereto.

Figure 27 is a transverse sectional view showing a strip or band applied to the pneumatic container for controlling the expansion of the extensible part thereof.

Figures 28 and 29 are longitudinal sectional views illustrating different ways in which the controlling strip or band shown in Figure 27 can be applied.

Referring to Figures 1 and 2, the pneumatic container or cushion 1 is provided with an extensible lower portion 2, and is supported on a base or foundation 3 which may be made of wood or any other suitable material, the said base or foundation being provided with an opening 4 adjacent to the extensible lower portion 2 of the container. The lower part 2 of the container may be made of good quality rubber and the upper part may be made of any suitable material such as rubbered fabric so as to be wholly or mainly inextensible in order to prevent expansion thereof when the container is under load. If desired the container may be made wholly or mainly of rubber or other extensible material and may be covered by a casing 5 made of or comprising inextensible material which would serve to prevent any distension or expansion of the upper part of the container. A casing such as shown at 5 may however be used with a container which is inextensible at its upper part so as to serve as a protective covering and to retain the container on the base or foundation 3. When the pneumatic container is subjected to load, the lower part 2 is caused to expand or distend within the said opening 4 in the base or foundation 3 so that to a large extent compression of the air within the container is prevented as the extensible lower part 2 of the container stretches to provide an increased air space, thus enabling greater resiliency to be obtained than is possible with a container which rests on a rigid foundation or support that does not permit of expansion or distension of the lower part of the container. The foundation or support may be of any suitable construction or shape depending on the shape or type of cushion, seat or the like which is to be used in conjunction therewith and it may be made of metal or any other suitable material which may be corrugated, fluted or otherwise formed to strengthen the same. The pneumatic cushion or container may be generally in the form of a complete unit which may be detachably or removably fitted on or against the foundation or support. In the example shown in Figure 3 the container 1 is provided with internal restraining means such as inextensible reeds or partitions 6 and its upper part may be constructed wholly or partly of inextensible material whilst the lower part 2 may be constructed of rubber or other extensible material as hereinbefore described. The said restraining reeds or partitions 6 prevent undue deformation or distortion of the container when under load so as to reduce the tendency to roll. In this example the foundation which may comprise a base 3 is provided with outer supports 7 against which the outer parts or edges of the container are placed as shown in Figure 3, whilst additional supports in the form of bars 8 may be provided in positions which coincide or register with the reeds or partitions 6 within the container. The reeds or partitions within the container divide the latter into a series of compartmen s and the lower part 2 of each compartment is capable of expanding within the spaces provided between the supports 7 and 8 as shown. In the example shown the supports 7 are provided with inclined or inwardly directed surfaces against which the lower edges of the container may bear so that when the adjacent parts of the container are caused to expand or distend they travel gradually along the said inclined surfaces, thus avoiding or eliminating any likelihood of the expanding portions of the container being damaged as might occur in cases where the said edges are supported on or bear against ledges provided on the support. The angle of the inclined supporting surfaces may vary according to the type or size of container to be employed and according to the inflation pressure which is to be used in the said container. In some instances the inclined surfaces or the members having the said surfaces may be adjustable to vary the inclination to suit the various types of cushions or pneumatic units. The said inclined supporting surfaces may if desired be slightly concave or convex. The upper parts of the supporting bars 8 may be rounded or provided with inclined or similar surfaces as aforesaid and in all instances the edges of the openings in which the expansible parts of the container extend when expanded may be rounded or inclined to prevent damage due to friction at these edges. A casing or exterior covering 5 may be provided if desired as shown in Figure 3. Figure 5 illustrates a modification generally similar to that shown in Figure 3, but in this case adjustable supporting bars 9 are provided in a frame having inclined outer supports and these bars 9 which may be of tubular or circular cross section can be moved to any desired positions in the said frame to suit different containers in which the reeds or restraining means 6 are located at different positions, the said bars 9 being adapted to fit at their ends in suitable slots or the like so that they can be readily moved to the desired positions according to requirements.

Figures 6 to 9 illustrate the invention diagrammatically as applied to pneumatic upholstery for motor cars. As shown in Figure 6 the seat comprises a suitable support or foundation 10 mounted so as to be disposed at an angle as shown, the said support comprising outer frame members 11 having inclined surfaces as aforesaid and intermediate bars or strips 12 disposed to register with restraining means 6 provided in the pneumatic cushion or seat. The squab or back part of the seat comprises a metal or other frame 13 to the upper and lower parts of which may be fitted bars 14 (see Figure 8) arranged in vertical planes so that spaces 15 are provided for permitting of expansion of the extensible rear part 2 of the pneumatic container 1 that is placed against the said frame and may be held in position in any suitable manner for example by means of a cover or casing 5 as hereinbefore referred to. In the case of a seat for motor vehicles, less height is required for the improved pneumatic seat or seats than is necessary in the case of ordinary seats and therefore the improved seat may be so positioned as to provide space below the same which may be utilised in any desired manner, for instance as a locker space or for storing tools without the seat itself being raised to a position higher than that which would be occupied by the ordinary seat. The upper or outer part of the pneumatic unit may be covered with leather or any other appropriate material.

Figures 10 to 15 illustrate the invention applied to a saddle for motor cycles and the general construction is similar to that previously described, in that it comprises a rigid foundation or support for a pneumatic container, the lower part of which is expansible. In Figures 10 to 12 the foundation or support may be in the form of a pan 16 having a longitudinal medial part 17 between two wells or recesses 18 formed in the pan as shown in Figure 12. The pneumatic container illustrated in this example by 19 may bear at its outer part on a rim 20 of the saddle pan and it may be covered by a leather or other casing or top 21 which may be secured to the said rim or the like 16 in any appropriate manner such as by detachable fastenings, lacing, spring bands or the said casing or covering may fit wholly or partly over the pan. When the saddle is under load the lower parts 19a of the container may expand between the wells or recesses 18 as hereinbefore described and in order that the air may be expelled from the said wells 18 the lower parts of the pan may be provided with holes 22 as shown in Figure 12. In this example the pneumatic container is provided with a restraining reed or partition 19b which registers with or is disposed above the medial supporting part or ridge 17. An inflation valve 23 (see Figure 10) may be provided to extend through the rear of the casing or cover 2 as shown.

Figures 13, 14 and 15 illustrate a construction of motor cycle saddle which is generally similar to that shown in Figures 10, 11 and 12, but instead of providing a longitudinal medial supporting member between two wells or recesses as aforesaid, the saddle pan 24 is formed with a well or recess 25 over practically the whole of its area and is provided with two transverse supporting members or bars 26 that extend from the edge or rim 27 of the pan as shown in Figure 14. The pneumatic container 28 having the expansible lower parts 28a is provided with transverse restraining reeds 28b that are disposed above the supporting members or bars 26 and the lower expansible parts of the container adjacent to the said supporting bars and the supporting edge or rim 27 of the pan are capable of expansion or distension into the said well or recess 25 when the saddle is under load as hereinbefore described. A hole or holes 29 is provided in the lower part of the pan to enable the air to be displaced when the lower part of the container is expanded. It is to be noted that the wells in the pan are inclined or similarly formed around the rim and along the medial part 17 to enable the extensible parts of the container to move or expand in contact therewith. Although the saddle pan may be provided with a well or wells as previously described, it may be constructed in the form of a frame having an opening or openings to receive the expansible parts of the container. Various forms of saddle pans or frames having openings as aforesaid as distinct from wells may be provided and examples of such saddle pans or frames are shown at 30 in Figures 16 to 21. In some instances the pans or frames 30 are provided with supporting bars or strips 31 disposed as shown in Figures 16 to 19 to provide a plurality of openings 32. The pneumatic container for use with saddles as shown in Figures 16 to 19 may be provided with internal restraining partitions or reeds in position to register with the supporting bars 31. The said supporting bars or strips 31 may be formed in one with the pan or frame 30, but they may if desired be constructed as separate pieces which may be detachably fitted in a frame or rim so as to assume positions as indicated in Figures 16 to 19. The saddle pans or frames 33 shown in Figures 20 and 21 are each provided with a single opening 34. In cases where the pan or frame 30 is formed with an opening or openings, the latter may be provided with a lower cover which protects the lower part of the container when placed on the said frame. The various constructions illustrated in Figures 16 to 21 may be formed by welled pans, that is to say, the metal pan would be shaped during manufacture to provide the wells corresponding in shape to the different openings as shown in these Figures or a welded pan may be provided with strips, bars or the like disposed as shown in Figures 16 to 19. The saddle foundation may be constructed of two parts that can be assembled together, one constituting a kind of frame whilst the other may be formed as a welled part of any desired shape and may be fitted in or to the said frame. Containers and supports such as shown in Figures 10 to 21 are also especially suitable for motor cycle pillion seats.

In the construction shown in Figures 22, 23 and 24 a pneumatic chamber 35 is formed by attaching a suitable piece of flexible material 36 to a metal plate or other base 37 so that the air space is provided between the latter and the material 36; for example the edge of the material 36 as shown in Figure 22 may be secured by vulcanization or in any other suitable manner as indicated at 36a to the plate 37 to form an air-tight joint and a cover and casing 38 may be provided if desired. In order to provide for expansion of the container under load as hereinbefore described, the said base 37 is provided with an opening or aperture 39 across which may extend a diaphragm 40 of rubber or other suitable material which is capable of being distended, this diaphragm being suitably secured to the base 37 so as to provide an air-tight joint at the edge of the opening 39. When the pneumatic unit is under load the diaphragm 40 is caused to expand in the said opening 39 so as to increase the air space and provide greater resiliency as hereinbefore described. In all cases where the pneumatic unit comprises a rigid base or foundation with suitable material attached to the edges thereof, to form the air space, the said edges may be slightly convex or rounded instead of being flat or straight so as to enable the edges of the flexible part of the container to be effectively stretched and securely retained in close contact with the foundation especially when a binding medium is employed, as greater tension or grip can be obtained on the material when stretched or passed over a convex edge than when stretched or passed over a straight edge. The corners of the foundation may also be rounded. The construction shown in Figure 23 also comprises a rigid base or foundation 37 such as a metal plate to which is secured a flexible top or covering 36 in an air-tight manner, but in this example the flexible top or covering in addition to being secured at its edges is secured by restraining means or reeds 41 to provide a plurality of air chambers or spaces which may or may not communicate with each other. An exterior casing or covering need not be provided in this example. In the example shown in Figure 24 which is somewhat similar to that shown in Figure 23, the flexible top or covering 36 in addition to being secured to the edge of the base 37 is secured directly to the middle part of the base, for example by rivets or the like 41a to provide a plurality of air spaces or chambers and in this case a leather or other covering 42 may be provided so as to extend over the pneumatic chambers. In both the examples shown in Figures 23 and 24 the said plate may be provided with openings 39 across each of which extends rubber or other similar material 40 which is capable of being distended into the said openings when the container is under load as hereinbefore described. In cases where the different air spaces or compartment communicate, it may be necessary to provide only one opening 39 and diaphragm 40 to allow for under expansion of the pneumatic chamber in which case this could be conveniently arranged at the lower part of the middle compartment. A covering may be secured to the underside of the base to protect the diaphragm 40 in any of the examples shown in Figures 22 to 24. Figures 25 and 26 illustrate constructions generally similar to those shown in Figures 22 to 24, but instead of providing a diaphagm 40 across an opening 39, the base 37 as shown in Figure 25 is provided with an open extension 43 around which is secured rubber or expansible material in the form of a cup 44 that can expand when the pneumatic unit formed by the top 36 and the base 37 is under load. In Figure 26 the said base 37 is provided with open or tubular extensions 45 to which may be secured a rubber tube 46 in an air-tight manner so that when the pneumatic unit is under load the said rubber tube 46 expands to provide an increased air space and greater resiliency as aforesaid. Pneumatic units constructed as shown in Figures 22 and 26 may be used for various purposes. The pneumatic container may comprise a rubber top part and inextensible side portion or walls with a lower part constructed of rubber which may be of a heavier gauge than that used to constitute the top part. In such a construction the upper part of the cushion may yield to ordinary shocks or pressure whilst in the event of greater shocks or pressure being transmitted or exerted the said openings, wells or recesses in the rigid foundation allow the rubber adjacent to the same to expand or stretch, to afford additional resiliency. The said openings or the like therefore provide a kind of secondary or auxiliary resilient medium which in some cases may be such as to prevent or damp excessive recoil.

The pneumatic container may be controlled so that it is not unduly expanded or distended when subjected to excessive loads or shocks. The construction shown in Figure 27 is generally similar to that shown in Figure 3 but at the lower parts 2 of the pneumatic container 1 between the supports 7 and 8, bands or strips 47 of extensible material, such as rubber, stockinette or the like are disposed so that for ordinary loads or shocks the lower part 2 of the container 1 can be expanded without stretching or distending the supporting bands or strips 47 which however come into use when the container is subjected to excessive loads so that they are themselves stretched and prevent undue distortion or stretching of the extensible parts of the container. The said controlling bands or strips 47 may be arranged in any suitable manner along or across the container and they may extend in different directions. In the example shown in Figure 28 the said bands or strips 47 may be secured to the outer part of the support or frame 7 as indicated at 48 so that the lower part 2 of the container rests upon the same. In the example shown in Figure 29 the controlling bands or strips 47 are attached at their ends to the side portions of the container as indicated at 49, which side portions may be inextensible. In both constructions shown in Figures 28 and 29 the lower parts of the container can be initially expanded or distended under ordinary loads or shocks without necessarily stretching the bands 47 to any substantial extent and the controlling bands or strips come into operation so as to be stretched when the container is subjected to excessive loads in order to prevent the lower part of the container from being unduly distended or stretched and detrimentally affected in consequence. In another construction, the lower or expansible parts of the cushion may be so manufactured, for example during the calendering of the rubber as to provide thickened parts which serve as the aforesaid controlling members in that they permit of expansion and distension of the parts adjacent thereto and eventually themselves come into operation when the cushion is subjected to excessive loads. Rubber or similar strands or strips may take the place of rigid supporting bars or strips such as hereinbefore referred to, and they may be secured at their ends to a frame or to the outer part of the foundation or support.

What I claim and desire to secure by Letters Patent of the United States is:—

1. A pneumatic cushion, seat or the like comprising an air container, inextensibly held at its outer part or edges, interior restraining means within the said container, a frame that supports the said outer part or edges of the container without the latter overhanging the frame, and at least one supporting member within said frame in contact with the container and in register with the restraining means, the portions of the container between the support afforded by the frame and the said supporting members being extensible so that they can be distended between the frame and the supporting members when the cushion is under load.

2. A pneumatic cushion, seat or the like comprising an air container with interior restraining means connected to the upper and lower parts, portions thereof being extensible from the said restraining means, the outer part of the cushion being inextensibly held, a supporting frame on which the container rests and at least one supporting member within the upper part of said frame to make contact with the lower part of the container adjacent to the said restraining means so that the extensible portions can be distended between the frame and the supporting member or members.

3. A pneumatic cushion, seat or the like comprising an air container with interior restraining means, a supporting frame having a bevelled surface on which the outer edges of the container are supported, a plurality of supporting members extending across the said frame in contact with the lower part of the container adjacent to the restraining means, and means for restraining the outer part of the container against expansion when the load is applied so as to enable extensible parts between the supporting frame and the supporting members to be distended, the outer distensible parts travelling gradually along the bevelled surface to prevent undue strain on these portions.

4. A pneumatic cushion, seat or the like, comprising an air container which is made of restraining material except at its lower part, and is provided with inextensible reeds or strips that connect the upper and lower parts and divide the latter into a number of expansible portions in combination with a frame having cross members at the upper part thereof to support the container and normally in contact therewith in register with said reeds or strips, the construction being such that the container is disposed within the limits of the frame and expands entirely within it and from the points of support afforded by the frame and the cross members.

5. A pneumatic cushion, seat or the like as in claim 4, in which the cross members are made of elastic material and are secured to the frame in such manner that they can be distended or stretched whilst at the same time affording points of support from which the extensible parts of the container can be distended.

6. A pneumatic cushion, seat or the like as in claim 4, in which the inner surface of the frame is bevelled to enable the extensible portions adjacent to the edges of the cushion to be gradually expanded along the same to prevent undue strain at this point.

AIMABLE VICTOR MELLANO.